US012383933B2

(12) United States Patent
Hume

(10) Patent No.: US 12,383,933 B2
(45) Date of Patent: Aug. 12, 2025

(54) PRODUCTION METHOD FOR PRODUCING PACKS OF CANS AND RELATIVE PRODUCTION LINE

(71) Applicant: SIDEL CANADA INC., Laval (CA)

(72) Inventor: Stan Hume, Zapopan (MX)

(73) Assignee: SIDEL CANADA INC., Laval (CA)

( * ) Notice: Subject to any disclaimer, the term of this patent is extended or adjusted under 35 U.S.C. 154(b) by 0 days.

(21) Appl. No.: 18/681,510

(22) PCT Filed: Aug. 5, 2022

(86) PCT No.: PCT/IB2022/057315

§ 371 (c)(1),
(2) Date: Feb. 5, 2024

(87) PCT Pub. No.: WO2023/012743

PCT Pub. Date: Feb. 9, 2023

(65) Prior Publication Data

US 2025/0128296 A1 Apr. 24, 2025

Related U.S. Application Data

(60) Provisional application No. 63/230,125, filed on Aug. 6, 2021.

(51) Int. Cl.
*B07C 5/38* (2006.01)
*B65B 35/54* (2006.01)

(52) U.S. Cl.
CPC ................ *B07C 5/38* (2013.01); *B65B 35/54* (2013.01)

(58) Field of Classification Search
CPC ......... B65B 35/54; B65B 65/003; B07C 5/38; B65G 57/186; B65G 59/02
See application file for complete search history.

(56) References Cited

U.S. PATENT DOCUMENTS 4,000,820 A * 1/1977 Kurk .................... B65G 47/086 414/791.8
10,343,857 B2 * 7/2019 Morency ................ B65G 61/00
(Continued)

FOREIGN PATENT DOCUMENTS

WO 2009076759 A1 6/2009

OTHER PUBLICATIONS

International Search Report dated Nov. 3, 2022 for PCT/IB2022/057315.

*Primary Examiner* — Anna K Kinsaul
*Assistant Examiner* — Nicholas E Igbokwe
(74) *Attorney, Agent, or Firm* — Blake T. Hudson

(57) ABSTRACT

A production method for producing packs of cans, having a first and second producing steps and a packing step. During the first producing step cans of a first flavor are produced and palletized into a stacked first flavor can pallet, and the stacked first flavor can pallet is transferred to a storage positioned between the upstream line and a downstream line. During the second producing step cans of a second flavor are produced and palletized into a stacked second flavor can pallet, and the stacked second flavor can pallet is transferred to the storage. During the packaging step the stacked first flavor can pallet and stacked second flavor can pallet are transferred from the storage, and the stacked first flavor cans pallet and the stacked second flavor cans pallet are depalletized to a downstream line. During the packing step, the first flavor cans and the second flavor cans are grouped and packaged into multi-flavor packs along the downstream line.

8 Claims, 4 Drawing Sheets

(56) References Cited

U.S. PATENT DOCUMENTS

| | | | | |
|---|---|---|---|---|
| 2015/0232215 | A1* | 8/2015 | Stocchi | B65B 61/14 53/48.2 |
| 2019/0248528 | A1* | 8/2019 | Gigante | B65B 29/00 |
| 2019/0248529 | A1* | 8/2019 | Klein | B65B 65/003 |
| 2020/0270072 | A1* | 8/2020 | Sforacchi | B65G 47/905 |
| 2020/0283177 | A1* | 9/2020 | Roelen | B65B 35/30 |

* cited by examiner

PRODUCTION METHOD FOR PRODUCING PACKS OF CANS AND RELATIVE PRODUCTION LINE

FIELD OF INVENTION

The invention relates to industrial line of production of packs of containers of a can type, herein after «can». More particularly, the invention relates to packing containers of multiple flavor can types from a storage location.

BACKGROUND OF THE INVENTION

Cans are made from a raw materials, especially a metallic sheet, in particular from an aluminum sheet or a steel sheet, including a stamping process.

Along a production line, cans are filled with a solid, fluid or liquid, especially a beverage type liquid, such as water, juice, soft drink or beer. Finally, the can is hermetically closed during a sealing process.

The production line comprises an upstream line dedicated to manufacture, to fill and to close cans, and also for pasteurizing or sterilizing. Such a production line comprises also a downstream line dedicated for packaging the cans.

Such packaging process first consists in grouping several cans, usually into square matrix configuration. Then one or more groups of cans are hold together in order to form a pack. Depending on the pack format, the grouped cans are tied together, wrapped with a plastic or paper sheet, or cased into a box, such as a cardboard crate. Especially one crate can receive several stages of cans, directly overlaid or separated by an inner layer, like a cardboard sheet. Finally, for their manutention and their transport, usually on a pallet, the can packs are stacked, eventually with a layer between each stage, such as a sheet or a tray made of a cardboard or of a plastic material.

Especially a tray comprises a ground flat surface, whereon the groups of cans vertically lay, resting on their bottom. The tray also can comprise peripheral walls, upwardly extending relative to the flat surface, in order to avoid the cans to laterally shift out of the tray.

As aforementioned a known can production line comprises the upstream line directly supplying the downstream line for packaging. Especially at an end of the upstream line, the cans are accumulated on a dedicated surface, such as an accumulation conveyor. Then the cans are transferred to an entry of the downstream line. The cans can be transferred by groups, in order to be tightened, wrapped or cased. The cans also can be transferred by single line flow or multi-line flow to the entry of the downstream line.

The accumulation of the cans is necessary due to the production rate of the upstream line, usually delivering a single flow of cans, conveyed one behind the others, regarding the packaging rate of the downstream line, usually handling several cans at a time.

A problematic of such production line resides into the packaging of several cans of different flavors into a same pack, so called a «multi-flavor pack». For packaging such multi-flavor pack, the downstream line must be supplied by as multiple flows of cans of the different flavors.

An existing solution consists in several upstream lines, each of them delivering one flavor to the downstream line. Such first solution is obviously restrictive, wherein requiring as many upstream lines as flavors, especially as many filling stations and closing stations. So each of the upstream lines requires a larger place to be implanted into industrial production site, and also the corresponding operators to supervised the production.

It is to be noticed that in the existing production lines of other type of containers, such as plastic or glass bottles, the empty bottles can be manufactured on an first part of the upstream line located at a different site, then the empty containers are stored in order to be transported into large groups to another production site, wherein a second part of the upstream line is dedicated to fill and close the containers.

Moreover the aforementioned drawbacks are still remaining for filling the empty containers by as many flavor liquid to obtain a multi-flavor pack.

SUMMARY OF THE INVENTION

An object of the present invention is to improve a method for production of multi-flavor packs of cans, and also a relative industrial line for production of packs of cans.

The invention improves a production method for producing packs of cans and a relative production line, which are both dedicated for packaging different flavors of liquid contained in the cans into a same pack. In other words, the invention aims the production of multi-flavor packs of cans.

Thenceforth, the invention comprises a middle storage warehouse located between the upstream line and the downstream line. Such middle warehouse is dedicated to store semi-finished goods in a palletized way, in the form of several pallets of stacked cans, especially full stacked can pallets. Moreover, each pallet comprises stacked cans of one flavor.

So the invention first allows the production of a first flavor cans through the upstream line, said first flavor cans being stacked on pallets stored into the middle storage warehouse. Then, at the end of the production of the first flavor cans, the invention provides at least the production of a second flavor cans through said upstream line. Said second flavor cans can also be stored onto pallets into the middle storage warehouse. As many producing steps are required as many flavors are to be stored in the warehouse.

Then, one or more flavors are retrieved from the middle storage warehouse and delivered to the downstream line, in order to pack the corresponding cans into multi-flavor packs.

Therefore, the invention first relates to a production method for producing packs of cans, wherein cans of a first flavor (A type) are produced, palletized, and transferred to a storage warehouse that is positioned at the center of the production line; and cans of a second flavor (B type) are produced, palletized, and transferred to the storage warehouse. During a packaging step, at least the stacked first flavor can pallet and stacked second flavor can pallet are transferred from the storage warehouse. Next, the stacked first flavor cans pallet and the stacked second flavor cans pallet are depalletized by an unstacking process to a downstream line. Finally, the first flavor cans and the second flavor cans are grouped and packaged into multi-flavor packs along the downstream line.

The invention also relates to a production industrial line for producing packs of cans, comprising an upstream line of production of cans, including at least manufacturing, filling and sealing stations, and a downstream line of production of packs of the cans, including at least a packaging station. The industrial line further includes a storage warehouse, located between the upstream line and the downstream line. The industrial line also includes a stacking station located between the upstream line and the storage warehouse, the stacking station comprising a handler with a palletization means of the cans into a stacked can pallet, and an unstacking station located between the storage warehouse and the downstream line, the unstacking station comprising another handler with a depalletization means of the cans from the stacked can pallet to the downstream line.

According to an embodiment, the invention allows to store about 350-500 cans per stage, into 8-14 stages (depending on the can dimensions) on the same stacked can pallet, which can weight around 2 tons (T).

It is to be noticed that the production method and the production line according to the invention also allows the production of packs of a single flavor cans. The invention also allows the storage of any flavor cans as long as wanted or required, for example because of a maintenance operated on the downstream line, or due to production and/or shipment requirements.

Moreover, the invention also allows storage in the warehouse of pallets of objects required for the stacking of cans, especially objects of the type of stacked pallets and stacked trays or layers. In particular the objects can be stacked on a pallet and strapped, then stored into the warehouse, until the objects are required. At this moment, the corresponding stacked object pallets are taken from the store, un-strapped to use each of the corresponding objects, such as a pallet as base for a new stack of cans, and/or a layer or a tray as a base on the pallet before receiving a stage of cans, or as a separation layer between a bottom stage of cans and before an upper stage of cans being stacked thereon, or also as covering the top of the upper stage of several stages of cans, before strapping to maintain them together on the pallet to be stored in the warehouse.

BRIEF DESCRIPTION OF THE DRAWINGS

The invention can be better understood on reading the following description given merely by way of example and with reference to the accompanying drawings, in which.

DETAILED DESCRIPTION

Figure 1:
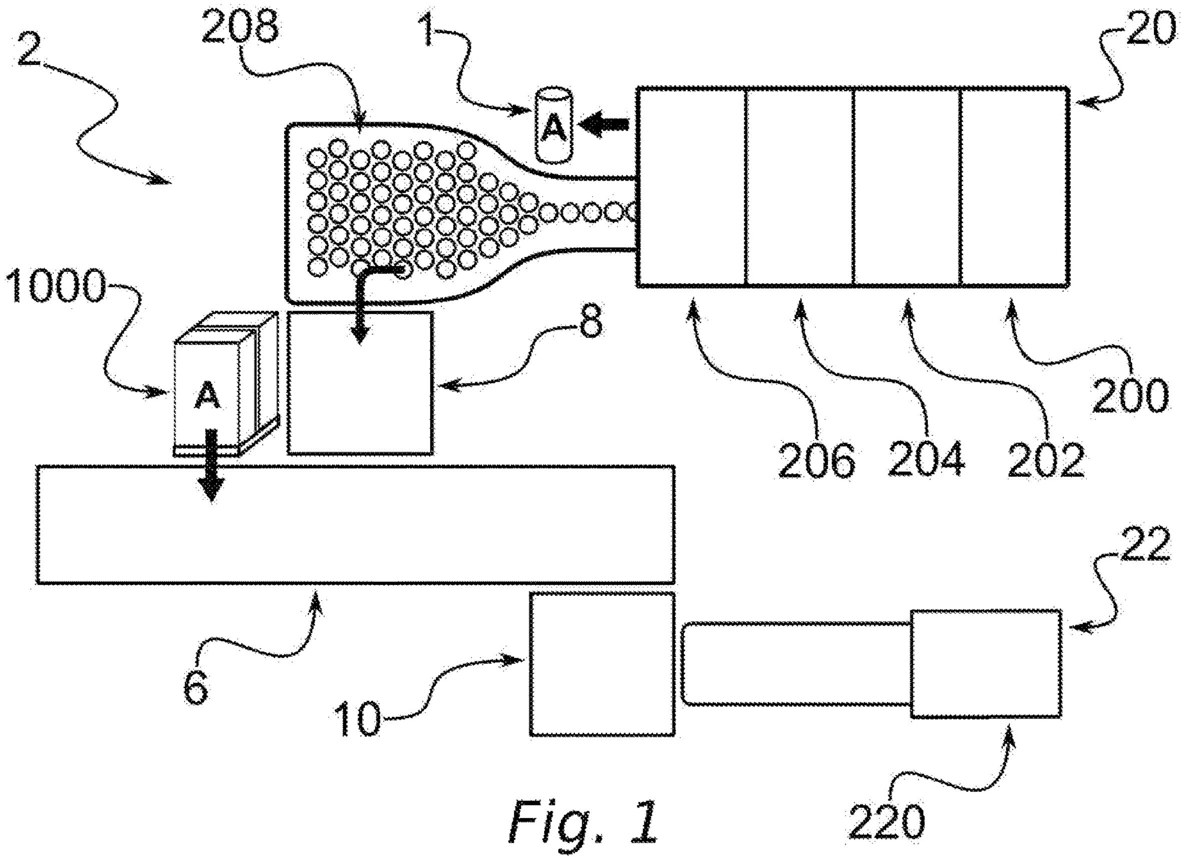
FIG. 1 is a top view of a simplified architecture of the production line, especially showing a first step of the production method according to a first embodiment, where producing cans of a first flavor of a "A" type and transferring stacked first flavor can pallets to the storage warehouse.

The invention relates to the production of packs 100 of cans 1.

As aforementioned, a can 1 is a container type, which globally has a cylindrical shape, with a circular cross-section. The cans 1 are made from a raw materials, especially a metallic sheet, in particular from an aluminum sheet or a steel sheet. The cylindrical shape of the cans 1 is obtained from the metallic sheet through a well-known stamping process.

The cans 1 are filled with a solid, fluid or liquid, especially a beverage type liquid, such as water, juice, soft drink or beer.

Finally, each of the cans 1 is hermetically closed during a sealing process. The peripheral wall of the cans 1 are can labelled, by stamping or printing, depending on the liquid the cans 1 are filled within during or after the sealing process.

The above-mentioned steps consist of a first producing step.

During a packaging step, several of the cans 1 are grouped usually into square matrix configuration. The size of the can matrix depends on the number of cans 1 and the desired dimension of the packs 100. A well-known matrix size is a pack 100 of six cans 1, with two rows and three columns.

Once grouped, each group of cans 1 are held together in order to form the pack 100. Depending on the pack format, the grouped cans 1 are tied together, wrapped with a plastic or paper sheet, or cased into a box or crate 102, such as a cardboard crate. One crate 102 can receive several stages of cans 1, directly overlaid or separated by an inner layer, like a cardboard sheet. Finally, for their manutention and their transport, usually on a pallet 104, several can packs 100 are stacked, eventually with a layer between each stage, such as a sheet or a tray 106 made of a cardboard or of a plastic material.

According to an embodiment, a tray 106 comprises a ground flat surface 1060, whereon the groups of cans 1 vertically lay, resting on their bottom. The tray 106 also comprises peripheral walls 1062, upwardly and/or downwardly extending relative to the flat surface 1060, especially along the lateral edges of the flat surface 1060, in order to avoid the cans 1 to laterally shift out of the tray 106.

It is to be noticed that the cardboard crates 102 are well-known made from a cutting cardboard sheet with folding lines, by folding process.

So the invention relates to production of cans 1 of different flavors into a same pack 100, so called a «multi-flavor pack». Therefore, the invention aims a production method for producing multi-flavor packs 100 of cans 1, and also a production industrial line 2 for producing multi-flavor packs 100 of cans 1, also called «production line 2».

According to an embodiment, the production line 2 is dedicated to improve the production method according to the invention.

According to an embodiment, the production line 2 first comprises an upstream line 20 of production of cans 1.

The upstream line 20 includes at least a manufacturing station 200, a filling station 202 and sealing station 204.

According to an embodiment, the manufacturing station 200 can comprise a stamping means to form the cans 1 from a raw materials, especially a metallic sheet, in particular from an aluminum sheet. The cylindrical shape of the cans 1 is obtained from the metallic sheet through a well-known stamping process.

The filling station 202 comprises a filling means to fill each of the cans 1 with a liquid. Such a filling means can be one or several filling valves.

The sealing station 204 comprises a sealing means to hermetically close the cans 1 one they are filled. Such a sealing means comprises a can seamer used to seal the lid on the top of the body of the cans 1.

The upstream line 20 can also comprise a pasteurizing or sterilizing station 206, located at a dedicated place relative to the other stations, for example after the sealing station 204. Such a pasteurizing or sterilizing station 206 allows to pasteurize or sterilize the filling content of the cans 1.

It is to be noticed that filling, sealing and eventually pasteurizing/sterilizing are so-called «canning».

Figure 2:
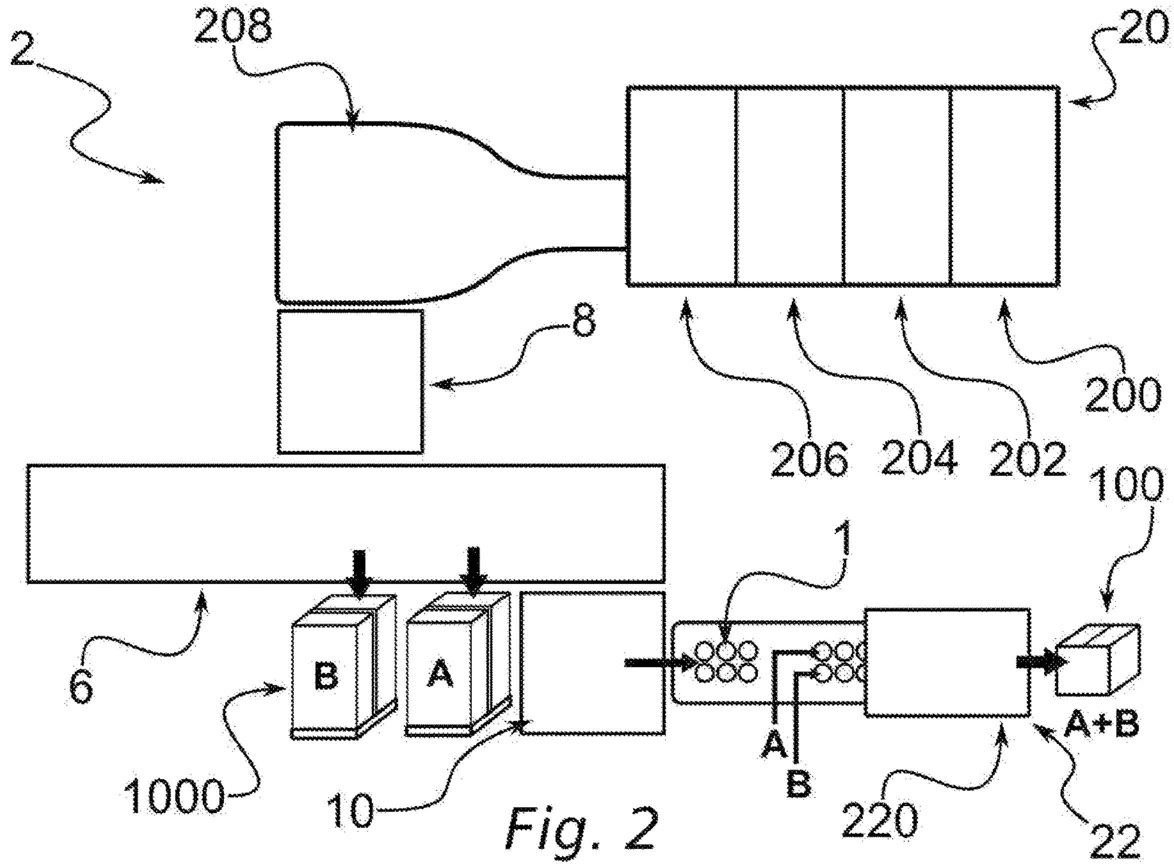
FIG. 2 is a similar view as FIG. 1, especially showing another step of the production method according to the first embodiment, where transferring stacked can pallets of the first type "A" flavor and stacked can pallets of a second flavor of a "B" type from the storage warehouse and packaging a multi-flavor pack of cans of a "A" type flavor and a "B" type flavor.
Figure 3:
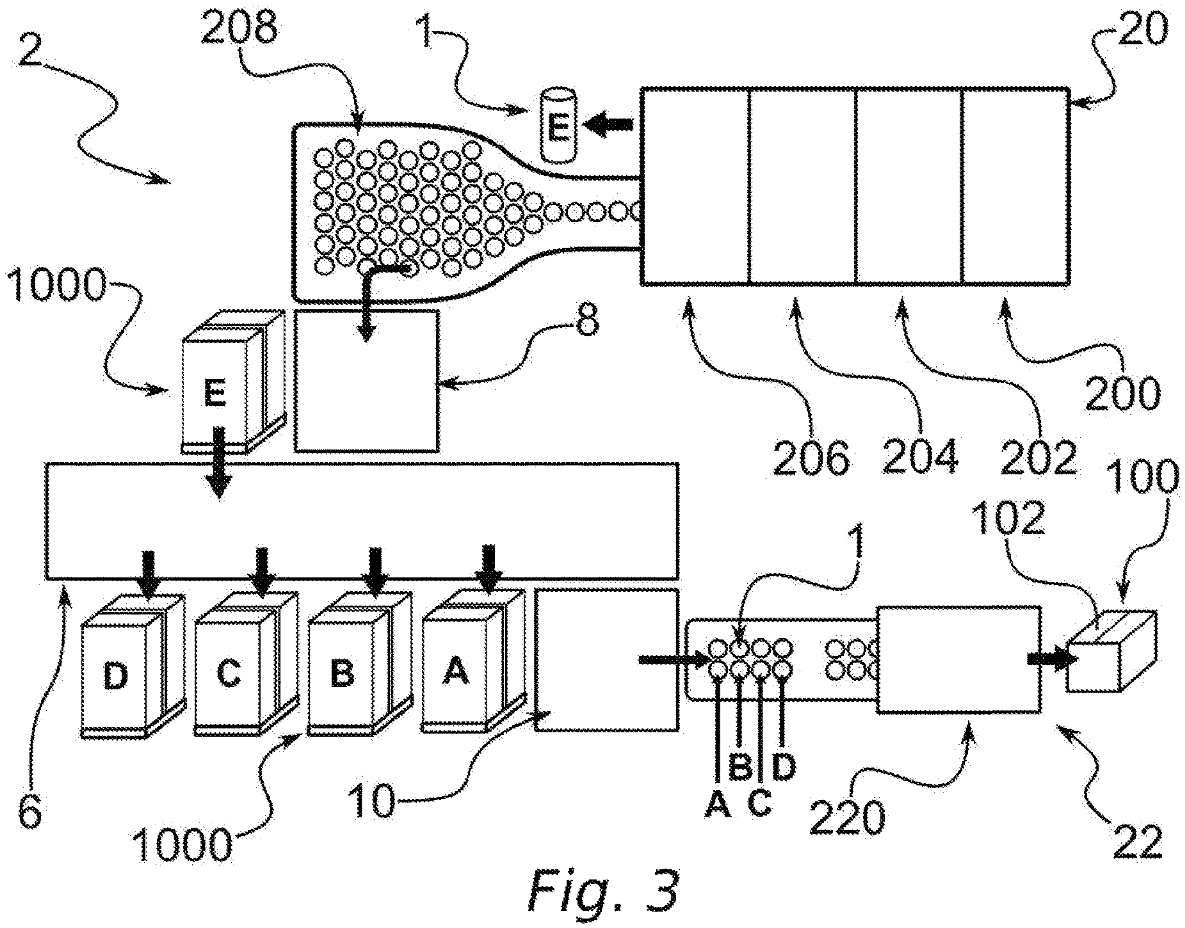
FIG. 3 is a similar view as FIG. 1, especially showing steps of the production method according to a second embodiment, where stacked cans of a type E flavor are transferred from the storage warehouse to be packaged with can pallets of multiple flavors, namely A, B, C, D type flavors to generate a multi-flavor pack of cans.

The abovementioned stations are located along the upstream line 20, along a producing direction, such as shown on the embodiments of FIGS. 1 to 3.

The upstream line 20 can also comprise a conveying means, to link and transfer the cans 1 from one station to another. Especially, at the end of the upstream line 20, the conveying means can comprise an accumulation surface 208, whereon the cans 1 accumulates.

According to an embodiment, the production line 2 also comprises a downstream line 22 of production of packs 100 of cans 1.

The downstream line 22 includes at least a packaging station 220. The packaging station 220 depends at least on the pack format. For example, as well-know, if the pack format is a crate 102, such as a cardboard crate 102, then the packaging station 202 comprises at least a folding means to fold the crate 102 from a cardboard, and also at least a handler to grab the cans 1 and deposit them into the crate 102.

The packaging station 220 can also comprise a palletizing means, to stacked several crates 102 onto a pallet 104, in view of their stocking or shipping. Straps are surrounding the stacked crates 102 in order to maintain the crates 102 together on the pallet 104, by a strapping or wrapping process.

According to the invention, the production line 2 is dedicated for production of flavor-multi packs 100.

Therefore, the production line 2 further comprises a storage warehouse 6. The storage warehouse 6 is located between the upstream line 20 and the downstream line 22. For example, the storage warehouse 6 is located in the middle of the production line 2. Such a position allows pallets 1000 to stored in a location that can be easily retrieved within the production line, instead of conventional methods of storing such stacked pallets in an offsite warehouse.

So, at the end of the upstream line 20, once the cans 1 are filled, they are not transfer to the downstream line 22, but the cans 1 are sent to the storage warehouse 6. Also, at the entry of the downstream line 22, the cans 1 are not directly delivered from the upstream line 20 but are taken from the storage warehouse 6.

Therefore, according to the embodiments shown in FIGS. 1 to 3, the production line 2 comprises a stacking station 8 located between the upstream line 20 and the storage warehouse 6. The stacking station 8 comprises a handler with a palletization means of the cans 1 into a stacked can pallet 1000. In some instances, the pallet is completely full of cans 1 (i.e., each layer 1064 is full of cans creating a full pallet full of cans 1).

The production line 2 also comprises an unstacking station 10 located between the storage warehouse 6 and the downstream line 22. The unstacking station 10 comprises another handler with a depalletization means of the cans 1 from the stacked can pallet 1000 to the downstream line 22.

According to another embodiment, not shown, the stacking station 8 and the unstacking station 10 can be integrated together into a same (un)stacking station. Moreover, the handler allows both palletization and depalletization.

According to an embodiment, not shown, any of the handler can be a well-known robotic arm, comprising several mobile segments relative to each other, forming a kinematic chain into tridimensional space. Such a robotic arm can also be mounted on a structure, especially mounted upright relative to the structure.

According to an embodiment, the handler comprises a handling tool. In the aforementioned embodiment of a handler comprising a robotic arm, the handling tool is located at the distal mobile end of the robotic arm.

Moreover, the handling tool is dedicated to handle one or several cans 1 at a same time, especially to handle several cans 1 at their top portion. Depending on the number of cans 1 to handle, the handling too can be of different well-known type. According to an embodiment, the handling tool comprises a gripping means, able to grab the top of the cans 1. Such gripping means can be of any type, especially a mechanic type, a vacuum pneumatic type or a magnetic type (especially for steel cans 1).

Figure 4:
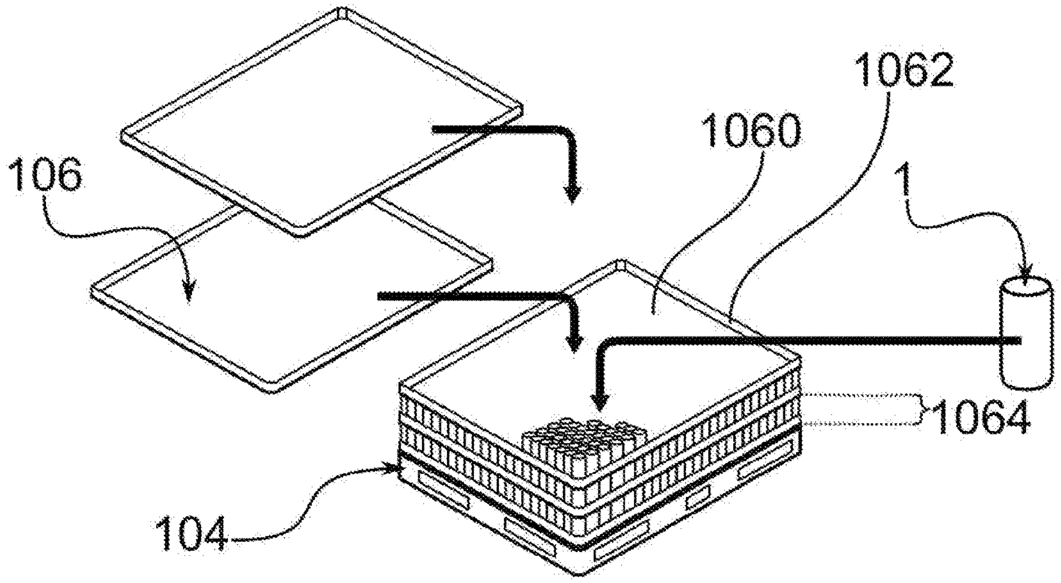
FIG. 4 is a perspective view of a stacking process of cans into a stacked can pallet.

Thus, for palletizing at the stacking station 8, the handler takes several cans 1 from the upstream line 20, especially the cans 1 accumulated at the end of the upstream line 20, to deposit the handled cans 1 on the pallet 104, especially on a tray 106 which was previously placed on the pallet 104 or on a previous can layer 1064. When a can stage is completed, another tray 106 is placed over the cans 1. Once all cans 1 stacked or when a determined number of stages are stacked, the top of the stacked can pallet 1000 is covered by a final top tray 106. Such stacking process is partially represented in FIG. 4.

According to an embodiment, palletizing allows to store about 500 cans 1 per layer 1064, up to 10 layers 1064 on the same stacked can pallet 1000, which can weight around 2 tons (T).

Then the stacked can pallet 1000 is maintained by a strapping process. At least one strap 1068, preferably several straps 1068 are placed surrounding the stacked can pallet 1000. The strap 1068 extends vertically along two of the opposite side, over the top tray 106 and also through the pallet 104, especially through holes well-known managed into the pallet 104.

Such a strap 1068 can be made of any type of material, especially of a composite or plastic material, especially a recyclable plastic material. Such a strap 1068 is a strip or tape, with two ends tied together, especially tied with a sealing thermic process.

Figure 5:
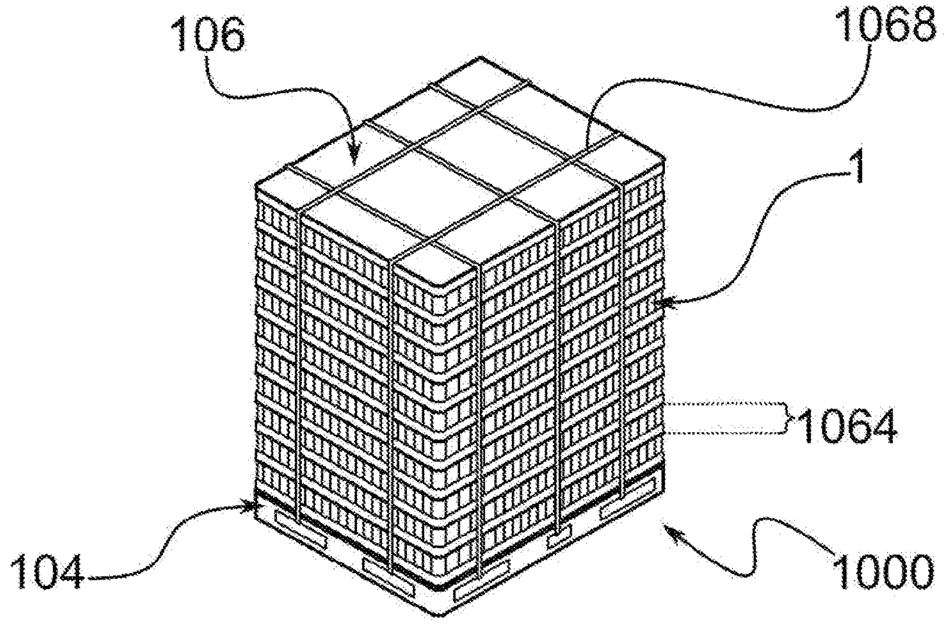
FIG. 5 is a perspective view of an embodiment of a stacked pallet of cans of a single flavor.

According to an embodiment, such as visible in FIG. 5, the stacked can pallet 1000 is surrounded by three straps along the longitudinal side and two straps along the lateral side of the stacked can pallet 1000.

A similar process is reversely realized for depalletizing at the unstacking station 10.

First the straps 1068 are removed, then the top tray 106 is removed to access the cans 1 located at the top layer 1064. Once all the cans 1 of a stage are transferred by the handler to the downstream station 22, then the free tray 106 is removed, and so on, till the last bottom tray 106 is removed. Then the free pallet 100 can be removed.

Figure 6:
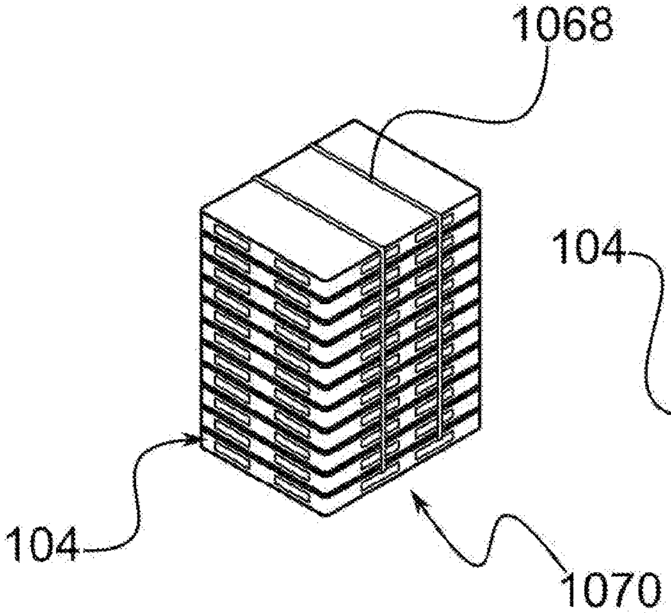
FIG. 6 is a perspective view of an embodiment of a stacked pallet of empty pallets.

According to an embodiment, during the unstacking process, the handler also allows stacking of several pallets 104 on a pallet 104, which can be also strapped into a stacked pallet 1070 of empty pallets 104, such as visible in FIG. 6.

Figure 7:
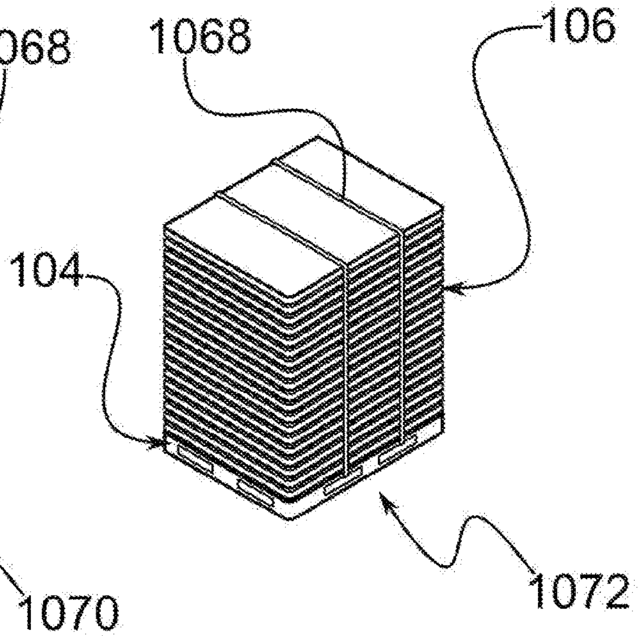
FIG. 7 is a perspective view of an embodiment of a stacked pallet of empty trays.

According to an embodiment, during the unstacking process, the handler also allows stacking of several trays 106, especially each of the removed tray 106 on a pallet 104, which can be also strapped, into a stacked pallet 1072 of empty tray 106, such as visible in FIG. 7.

According to an embodiment, during the stacking process, the handler can take a pallet 104 from the stacked pallet 1070 of empty pallets 104, after the straps 1068 are removed.

According to an embodiment, during the stacking process, the handler can take a tray 106 from the stacked pallet 1072 of empty trays 106, after the straps 1068 are removed.

Figure 8:
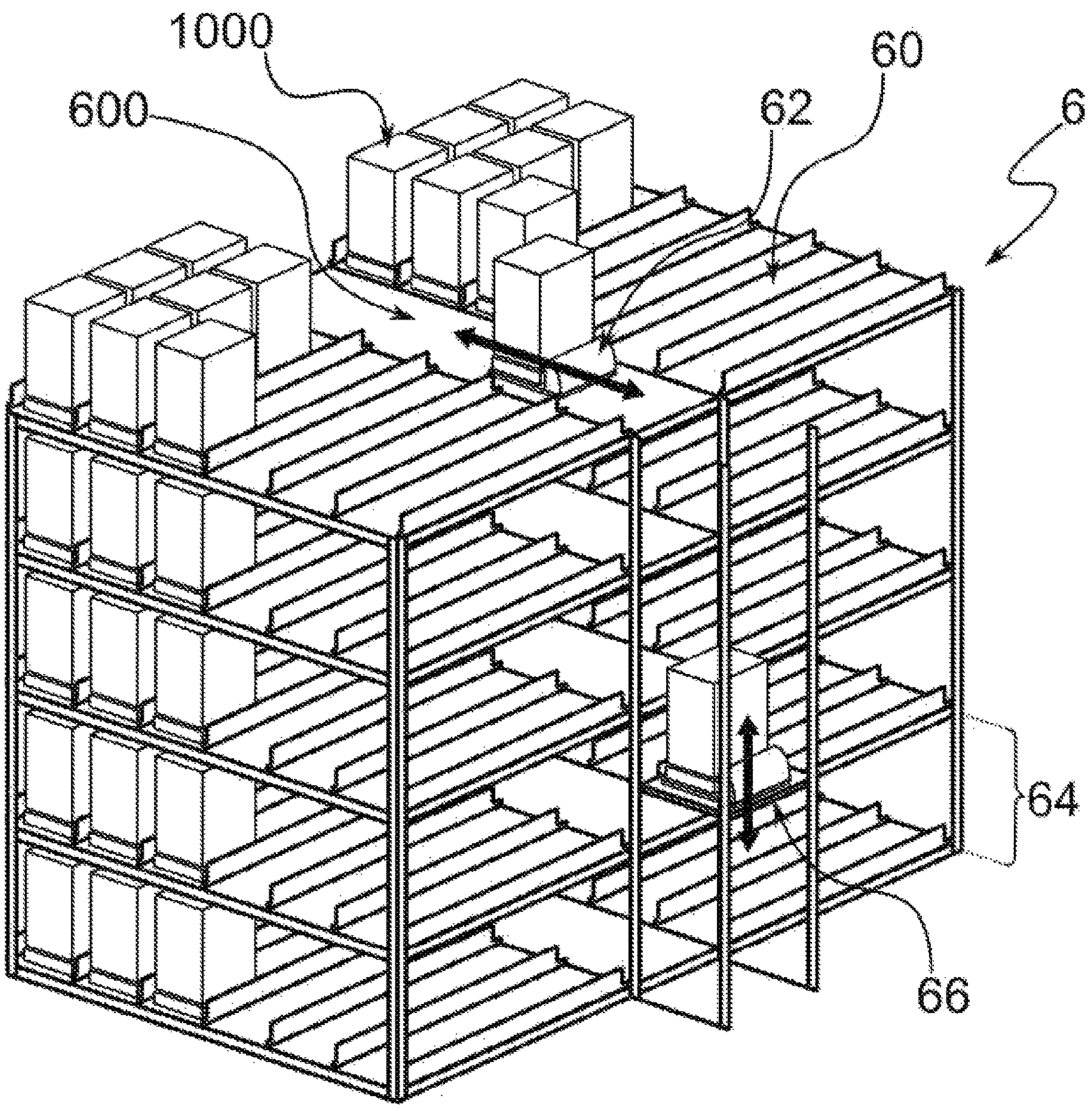
FIG. 8 is a perspective view of the storage warehouse positioned between the upstream and downstream lines.

Thus, after stacking, it is possible to store the stacked can pallets 1000 into the storage warehouse 6 (FIG. 8). As previously stated, the storage warehouse 6 is positioned between the upstream line 20 and downstream line 22 (e.g., positioned in the middle of the production line 2) to allow ease of access for retrieval.

According to an embodiment, the storage warehouse 6 comprises an automatic conveyor means of the stacked can pallets 1000. The warehouse 6 can also include stacked pallets 1070 of the empty pallets 104 and/or stacked pallets 1072 of the empty trays 106. Moreover, as illustrated in FIG. 8, the storage warehouse 6 comprises storage bays 60, each of the storage bays 60 being dimensioned to receive at least one of the stacked can pallet 1000 (also of the stacked pallets 1070/1072, not shown) and being accessible to the automatic conveyor. In other words, a storage bay 60 comprises dimensions that allow the insertion of a pallet 104 of standard pallet sizes, including the space necessary for the automatic conveyor to place and retrieve a stacked pallet 1000 respectively to and from the storage bay 60.

According to an embodiment, the several storage bays 60 are linked along a crane aisle 600. In other words, the storage warehouse 6 comprises at least a crane aisle 600, the storage bays 60 being located and accessible along the crane aisle 600.

According to an embodiment, the automatic conveyor comprises a satellite 62, such as a pallet truck. The satellite 62 is automobile or automotive. The satellite 62 is compatible to handle a stacked can pallet 1000 (i.e. any standard size pallet 104 and also of the stacked pallets 1070/1072). Such truck 62 can be autonomous (e.g., its movements and also the path to store and retrieve pallets to and from the storage bays 60 being commanded by a main control panel).

According to the corresponding embodiment, the truck 62 moves along the crane aisle 600 to reach the storage bays 60. So the crane aisle 600 comprises suitable dimensions, in order to allow the movement of the truck 62 (empty or handling a stacked can pallet 1000).

According to an embodiment, the storage warehouse 6 comprises several stories 64. The stories 64 are vertically located one on top of the other, leaving sufficient space fort the pallets 1000, 1070, 1072. In order to deliver the stacked can pallet 1000 (also of the stacked pallets 1070/1072) to one of the stories 64 and retrieve it from the same or another of the stories 64, the automatic conveyor means comprises a crane 66 that serves the several stories 64, like an elevator. Thus, the crane 66 comprises suitable dimension to allow the insertion of the truck 62, handling or not a stacked can pallet 1000 (also of the stacked pallets 1070/1072). So each of the stories 64 comprises several of the storage bays 60. Such elevator 66 is preferably autonomous, in order to serve the corresponding stories 64, through the command of a main control panel.

According to the corresponding embodiment, the crane 66 is located within the crane aisle 600.

According to the corresponding embodiments, the main control panel comprises a centralized computer unit, wherein a software is executed. The software is dedicated for the management of the storage warehouse 6, especially without limitation:

- recording or registering of the stacked can pallet 1000 (also of the stacked pallets 1070/1072) in a defined of the storage bays 60 (and eventually in a defined stories 64 where the defined storage bay 60 is located);
- recording or registering of the flavor type of a stacked can pallet 1000 (also of the stacked pallets 1070/1072) located in the defined of the storage bays 60;
- recording or registering the number of cans 1 of each stacked can pallets 1000 stored into the corresponding storage bay 60;
- commanding the movements of the truck 62 and/or the crane 66 to deliver a stacked can pallet 1000 to or to retrieve a stacked can pallet 100 from a defined of the storage bays 60.

Moreover, the main control panel can also command the stacking station 8 and/or the unstacking station 10, preferably the packaging station 220 such as detailed thereafter.

According to an embodiment, the packaging station 220 comprises a sorting means at least of first cans 1 of a first flavor and of second cans 1 of a second flavor into a multi-flavor pack 100. Preferably the sorting means allows the realization of a multi-flavor pack 100 of a desired number of flavor type cans 1.

The embodiment visible in FIG. 2 shows the sorting means of a first flavor (A type) cans 1 and a second flavor (B type) cans 1 from corresponding stacked A type flavor can pallet 1000 and stacked B type flavor can pallet 1000. Moreover, the sorting means orders the A type flavor cans 1 and B type flavor cans 1 into desired positions, regarding the multi-flavor pack 100 to be realized of A+B type flavor cans 1. As example shown in FIG. 2, the sorting means arranged the cans 1 into a matrix configuration with two rows: one A type flavor row and one B type flavor row.

In such an embodiment, the corresponding stacked can pallets 1000 (of A type cans 1 and of B type cans 1) are retrieved from the defined known storage bays 60 of the warehouse 6, before sorting, through the command of the main control panel.

The embodiment visible in FIG. 3 shows the sorting means of A type flavor cans 1, B type flavor cans 1, C type flavor cans 1 and D type flavor cans 1 from corresponding stacked A type flavor can pallet 1000, stacked B type flavor can pallet 1000, stacked C type flavor can pallet 1000 and stacked D type flavor can pallet 1000. Moreover, the sorting means orders the A type flavor cans 1, B type flavor cans 1, C type flavor cans 1 and D type flavor cans 1 into desired positions, regarding the multi-flavor pack 100 to be realized of A+B+C+D type flavor cans 1. As example shown in FIG. 3, the sorting means arranged the cans 1 into a matrix configuration with four columns: each of the columns comprises A type flavor cans 1, B type flavor cans 1, C type flavor cans 1 and D type flavor cans 1. Any configuration can be arranged by the sorting means.

In such an embodiment, the corresponding stacked can pallets 1000 (of A type cans 1, of B type cans 1, of C type cans 1 and of D type cans 1) are retrieved from the defined known storage bays 60 of the warehouse 6, before sorting, through the command of the main control panel.

According to an embodiment, the sorting means can be a dedicated unit of any type integrated in the packaging station 220. Such as a sorting conveyor with channels provided with a flavor type cans 1 from one or several corresponding accumulation surfaces, whereon the corresponding type flavor cans 1 are deposited when unstacking.

According to another embodiment, the sorting means are integrated at least partially into the unstacking station 10. Especially the robotic arm and the handling tool are commanded to unstack the corresponding type flavor of cans 1 from of each of the corresponding type flavor stacked can pallet 1000, and also the desired number of the corresponding type flavor of cans 1, to deliver them to the packaging station 10 in the desired configuration of the multi-flavor pack 100.

Such commanding of the sorting can be achieved thanks to the main control panel.

As previously mentioned, the invention relates to a production method, wherein during a first producing step, cans 1 of a flavor of a first flavor (A type) are produced by at least manufacturing, filling and sealing along the upstream line 20. Then the A type flavor cans 1 are palletized by a stacking process into at least one stacked A type flavor can pallet 1000.

It is to be noticed that the stacking process is complete for each stacked can pallet 1000. In other words, all layers 1064 are filled with as many cans 1 as possible, and also the top tray 106 recovers the last top layer 1064 and the straps 1068 are placed around.

Moreover, the stacking process is operated on a first stacked can pallet 1000 until it is fully completed. The complete stacked can pallet 1000 is being transferred to the storage warehouse 6, while a second stacked can pallet 1000 is being palletized, with the corresponding cans 1 which continue to arrive from the upstream line 20.

At the end of a type flavor cans 1 production, a stacked can pallet 1000 can be uncomplete, due to a lack of the number of cans 1 of the corresponding type flavor to completely fill the last upper layer 1064. The top tray 106 is deposited as recovering this last top layer 1064 and then the straps are surrounding this uncomplete stacked can pallet 1000. Finally, the stacked A type flavor can pallet 1000 is transferred to the storage warehouse 6.

According to the corresponding embodiments aforementioned, the transfer of the stacked can pallet 1000 is operated by the conveyor means (truck 62 and/or crane 66), to deliver the stacked can pallet 1000 to a corresponding of the storage bays 60, especially under main control panel management.

Then, so after the end of the first producing step of A type flavor cans 1, the production method comprises a second producing step of another type flavor cans 1.

During said second producing step, in a similar way, cans 1 of a second flavor (B type) are produced by at least manufacturing, filling and sealing along the upstream line 20. Then, the B type flavor cans 1 are palletized by the stacking process into at least a stacked B type flavor can pallet 1000. Finally, the stacked B type flavor can pallet 1000 is transferred to the storage warehouse 6.

According to an embodiment, after the end of the second producing step of B type flavor cans 1, the production method comprises as many other producing steps of another type flavor cans 1 as desired. In other words, the method comprises repeating at least once the producing step of cans 1 of another type of flavor, from at least manufacturing, filling and sealing, then stacking till transferring and stocking each another type flavor in the storage warehouse 6.

According to a preferred embodiment, the production method comprises a packaging step. During the packaging step, at least the stacked A type flavor can pallet 1000 and stacked B type flavor can pallet 1000 are transferred from the storage warehouse 6.

The stacked A type flavor cans pallet 1000 and the stacked B type flavor cans pallet 1000 are depalletized by an unstacking process to the downstream line 22.

Then the A type flavor cans 1 and the B type flavor cans 1 are grouped and packaged into multi-flavor packs 100 along the downstream line 22.

Especially as many stacked can pallets 1000 of each A type and B type flavor cans 1 are retrieved from the storage warehouse 6, in order to complete as many multi-flavor packs 100 (of A+B type flavors) as required or desired.

According to the abovementioned embodiment, the production method comprises repeating at least once the producing step of cans 1 of another type of flavor.

Then, so after all previous producing of any type flavor cans 1, during the packaging step, for each another type flavor, the production method comprises the steps of transferring stacked another type flavor can pallets 1000 from the storage warehouse 6.

The production method also comprises depalletizing the stacked another type flavor can pallets 1000 by the unstacking process to the downstream line 22.

As previously mentioned, depalletizing is achieved by the unstacking station 10.

Moreover the unstacking station 10 can provides the cans 1 of each type flavor to the downstream line 22 in a way that as many number of each type flavor cans 1 are handled to be transferred to the packaging station 220, including the corresponding sorting desired.

The production method also comprises along the downstream line, grouping and packaging another flavor type cans 1 into multi-flavor packs 100. So as many stacked can pallets 1000 of each type flavor cans 1 (A,B,C,D and/or are any another type flavor) are retrieved from the storage warehouse 6, in order to complete as many multi-flavor packs 100 as required or desired.

The invention allows production, stacking and stocking of several different types of flavor cans 1, without any limitation in number. According to a preferred embodiment, up to seven or eight different type flavors cans 1 are produced, stacked and stocked into the storage warehouse 6, then retrieved to package the corresponding multi-flavor packs 100.

According to an embodiment, the production method considers to produce another type flavor cans 1 along the upstream line 20, when realizing the multi-flavor packs 100 of the different flavor cans 1 transferred from the storage warehouse 6. So, the production line 2 is full operating, even if the upstream line 20 produces type flavor cans 1 which are not desired in the multi-flavor packs 100 which are packaged in the same time along the downstream line 22.

Therefore, the production method comprises during the packaging step, that cans 1 of a flavor of another type are produced by at least manufacturing, filling and sealing along the upstream line 20. The other type flavor cans 1 are palletized by the stacking process into at least a stacked type another flavor can pallet 1000. The stacked another type flavor can pallet 1000 is transferred to the storage warehouse 6.

The embodiment visible in FIG. 3 shows the production of E type flavor cans 1 along the upstream line 20, till palletizing stacked E type flavor can pallets 100 to transfer them in the storage warehouse 6. Meanwhile the stacked can pallets 1000 of A type cans 1, of B type cans 1, of C type cans 1 and of D type cans 1 are retrieved from the defined known storage bays 60 of the warehouse 6, to be depalletized and transfer the corresponding type flavor cans 1 to the downstream line 22 for packaging the A+B+C+D type multi-flavor packs 100.

According to an embodiment, the packaging step comprises a sorting process of the cans 1 of each of the type of flavors.

As aforementioned, according to the corresponding embodiments, such sorting orders the different type flavor cans 1 into a desired matrix configuration, depending on the desired multi-flavor packs 100 to be realized.

Such sorting is operated by above-mentioned sorting means, especially under command of the main control panel.

Thus, the invention allows the production and the storage of different type flavor cans 1, in order to retrieve them in due time to package desired multi-flavor packs 100 of as many different type flavor cans 1, previously stored, as desired. Thanks to locating the semi-finished goods storage warehouse 6 in the middle of the production line 2, instead of upstream or downstream of the packaging line where it has always been historically, the invention totally changes and optimizes the way of producing and packaging.

Moreover, the invention allows for small or no packaging waste generation in the repacking activity of packaging multi-flavor packs 100, through almost the full use of recyclable components, especially pallets, trays and straps made of recyclable plastic materials. Especially the invention does not require any reconditioning or repacking, which usually induces high intensive manual labors to manually break the carrier packs, in order to retrieve the cans 1 to be repacked into the multi-flavors packs 100. The invention is limited of human labor, thanks to a supervised automated stacking and storing process.

Such automated operating allows high speed process, around 300,000 cph (cans per hour) stored to and/or retrieved from the storage warehouse 6. Additionally, positioning of the storage warehouse 6 within the production line 2 (between the upstream line 20 and the downstream line 22), enhances the operation speed of the line 2. For example, storage in the middle of the production line 2, between canning and packaging, with such an high rate of operating, allows to fully increase the canning production rate of the upstream line 20 and the packaging rate of the downstream line 22, which can reach around 240,000 cph.

The invention also allows to oversize full stacked pallets 1000 of cans 1 which can hold around 5,000 cans 1 per pallet 104.

The invention claimed is:

1. A production method for producing packs of cans, wherein during a first producing step cans of a first flavor (A type) are produced by at least manufacturing, filling and sealing along an upstream line;

the first flavor cans are palletized by a stacking process into at least a stacked first flavor can pallet;

the stacked first flavor can pallet is transferred to a storage warehouse that is positioned between the upstream line and a downstream line;

wherein during a second producing step cans of a second flavor (B type) are produced by at least manufacturing, filling and sealing along the upstream line;

the second flavor cans are palletized by the stacking process into at least a stacked B type flavor can pallet;

the stacked second flavor can pallet is transferred to the storage warehouse;

during a packaging step;

at least the stacked first flavor can pallet and stacked second flavor can pallet are transferred from the storage warehouse;

the stacked first flavor cans pallet and the stacked second flavor cans pallet are depalletized by an unstacking process to a downstream line; and the first flavor cans and the second flavor cans are grouped and packaged into multi-flavor packs along the downstream line.

2. The production method according to claim 1, wherein during the packaging step cans of a flavor of another type are produced by at least manufacturing, filling and sealing along the upstream line;

the another type flavor cans are palletized by the stacking process into at least a stacked another type flavor can pallet;

the stacked another type flavor can pallet is transferred to the storage warehouse.

3. The production method according to claim 1, wherein repeating at least once the producing step of cans of another type of flavor and during the packaging step, for each another type flavor;

transferring stacked another type flavor can pallets from the storage warehouse;

depalletizing the stacked another type flavor can pallets by the unstacking process to the downstream line;

along the downstream line, grouping and packaging the another flavor type cans into multi-flavor packs.

4. The production method according to claim 3, wherein the packaging step comprises a sorting process of the cans of each of the type of flavors.

5. A production industrial line for producing multi-flavor packs of cans, comprising an upstream line of production of cans, including at least manufacturing, filling and sealing stations;

a downstream line of production of packs of the cans, including at least a packaging station;

the industrial line further comprising a storage warehouse, located between the upstream line and the downstream line;

a stacking station located between the upstream line and the storage warehouse, the stacking station comprising a handler with a palletization means of the cans into a stacked can pallet; and an unstacking station located between the storage warehouse and the downstream line, the unstacking station comprising another handler with a depalletization means of the cans from the stacked can pallet to the downstream line.

6. The production industrial line according to the claim 5, wherein the storage warehouse comprises an automatic conveyor means of the stacked can pallet; and storage bays, each of the storage bays being dimensioned to receive at least one of the stacked can pallet and being accessible to the automatic conveyor.

7. The production industrial line according to the claim 6, wherein the storage warehouse comprises several stories and the automatic conveyor means comprises a crane that serves the several stories.

8. The production industrial line according to the claim 5, wherein the packaging station comprises a sorting means at least of first cans of a first flavor and of second cans of a second flavor into a multi-flavor pack.

* * * * *